No. 894,532. PATENTED JULY 28, 1908.
C. REEVES.
JOURNAL BEARING ADJUSTMENT.
APPLICATION FILED JULY 22, 1905.

Witnesses:

Inventor.
Clifton Reeves:
By his attorney;
F. H. Richards.

UNITED STATES PATENT OFFICE.

CLIFTON REEVES, OF TRENTON, NEW JERSEY, ASSIGNOR TO WILLIAM HARRISON JAMISON, OF TRENTON, NEW JERSEY.

JOURNAL-BEARING ADJUSTMENT.

No. 894,532.  Specification of Letters Patent.  Patented July 28, 1908.

Application filed July 22, 1905. Serial No. 270,747.

*To all whom it may concern:*

Be it known that I, CLIFTON REEVES, a citizen of the United States, residing in Trenton, in the county of Mercer and State of New Jersey, have invented certain new and useful Improvements in Journal-Bearing Adjustments, of which the following is a specification.

This invention relates to and has for an object to provide means for adjusting machine parts toward and from each other, and more particularly for adjusting the parts of a journal bearing, as for instance, the cap of a two-part journal bearing relatively to the bearing or fixed portion thereof, and consists in a sleeve surrounding the bolt for holding the cap in place and having a screw-threaded connection with one of the parts, generally the cap, and which sleeve is adapted to be rotated by some suitable means, such as a collar, slidingly engaging the sleeve, and occupying a position between the nut on the bolt and the cap so that the setting down of the nut upon the bolt will clamp the collar in place and also clamp the sleeve against independent rotation, the sleeve in this manner being held not only by means of the collar connected to it, which may be a key connection, but also by the jamming of the screw threads of the sleeve against those of the bearing member by which it is carried.

Figure 1:
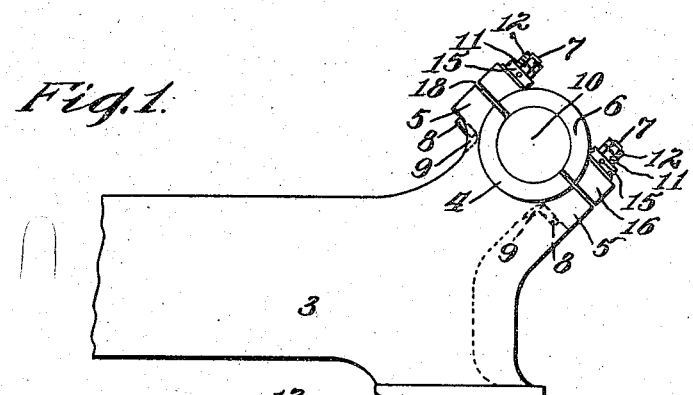
Figure 2:
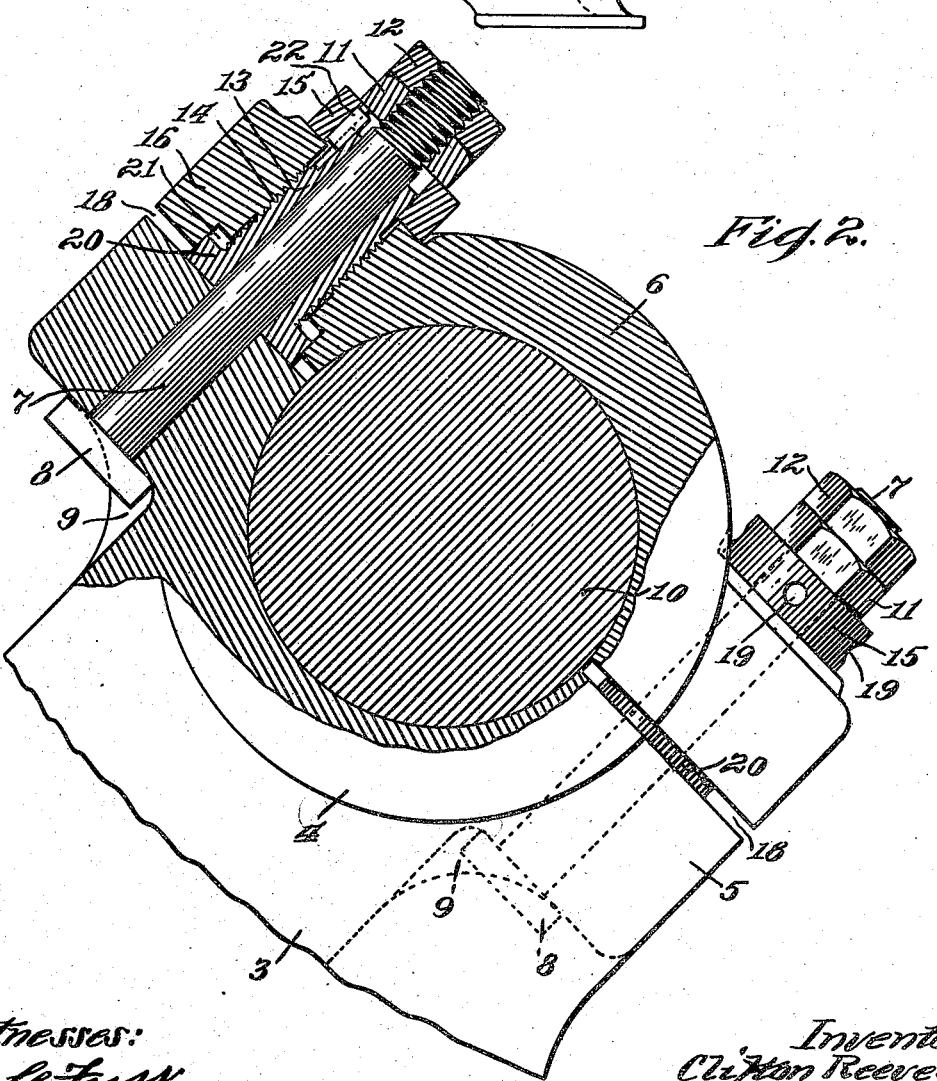

In the drawings accompanying and forming a part of this specification Figure 1 illustrates an end view of a portion of an engine frame provided with a practicable embodiment of the present improvement, and Fig. 2 is an enlarged view of the bearing portion thereof illustrated in longitudinal section transverse to the axis of the shaft; a portion, however, of the parts in Fig. 2 are shown in side view instead of section.

Although the invention may be applied to various machine parts requiring adjustment, one relatively to the other, yet the invention is peculiarly adapted for journal bearings where the bearing is separated, as for instance, where there is a cap portion and a portion which is relatively stationary and toward and from which the cap will require to be adjusted for taking up wear and changing the fit of the journal in the bearings.

For illustrating a manner of application of the improvement, it is shown mounted upon the framing member 3 of an engine and in connection with a bearing, one half 4 of which is cast with the frame and may for convenience be called the bearing portion, and the frame at each side at the region of its juncture with the cap is provided with overhanging portions 5 somewhat in the nature of flanges. The adjustable part of the bearing here shown as a cap 6, is held in place by some suitable bolts 7, each of which has a head 8 resting against the under side of one of the flanges 5 and received between wings 9, which prevent the bolt from turning when the nuts upon the same are turned down.

A shaft 10 is shown mounted in the bearing to illustrate the application of the invention. Each of the bolts 7 is provided with a pair of nuts 11 and 12 for tightening down the cap upon the journal, thus making its bearing tighter or looser according as the conditions of running may require, and to compensate for wear when it is desired to maintain such running conditions substantially constant. The nuts will tighten the cap down upon the shaft, and for the purpose of limiting the degree of such tightness, means are employed for holding the cap away from the stationary part of the journal bearing, and which means comprise a sleeve 13 mounted upon each of the bolts 7.

The sleeve in the present illustration has a screw-threaded connection as at 14 with the cap, and has a sliding connection with a collar or nut 15 in the nature of a washer, which connection permits independent longitudinal movement, but compels the parts to rotate in unison; the collar or nut 15 is interposed between the flange or projecting portion 16 of the cap and the nuts 11 and 12. A spline 22 is here shown for giving a suitable longitudinal sliding movement between the collar and sleeve. When it is desired to vary the space as 18 between the cap and the bearing, the nuts will be loosened and the collar may then be rotated in some suitable manner, as by means of a spanner wrench entering suitable recesses 19 in such plate. The rotation of the collar in the proper direction screws the sleeve toward or from the cap as occasion may demand. For the purpose of giving the cap greater stability or rigidity when it is finally adjusted in position the sleeve may be provided with a foot portion comprising a flange 20. To enable this flange to be properly accommodated when it is desired to limit the space 18, or to adjust the parts so that such space ceases to exist, the bore in the cap through which the sleeve extends may have an enlarged or chambered portion 21, in which the foot portion will partly normally be received, and into which it may be entirely withdrawn when it is desired to clamp the parts of the bearing tightly together.

In the present illustration both ends of the cap are shown provided with similar adjusting means, but it will be apparent to those skilled in the art that this duplication is not in all cases necessary for the proper working of the device.

Having described my invention I claim:

A two-part bearing comprising a base and a cap having an opening therethrough, the opening through one member being of larger diameter than that through the other and having its wall threaded and provided with a communicating annular recess adjacent the opposed face of the companion member of said bearing, a rotatable exteriorly threaded sleeve fitting said larger opening and provided with an annular flange fitting said recess and engaging said companion member to afford greater stability and rigidity to the cap, said threaded sleeve engaging the other member of said bearing, a bolt fitting the unthreaded opening and sleeve and provided on its opposite ends with opposed clamping means for exerting pressure on the exterior walls of said base and cap, and a collar between and engaging one of said members and the clamping means on one end of the bolt and exteriorly splined to said threaded sleeve to permit longitudinal adjustment of said threaded sleeve and for rotating said sleeve.

CLIFTON REEVES.

Witnesses:
ELLWOOD W. WATSON,
EDWIN T. FITZGEORGE.